US012725428B2

(12) United States Patent
Motegi et al.

(10) Patent No.: US 12,725,428 B2

(45) Date of Patent: Sep. 1, 2026

(54) DRIVING ASSIST APPARATUS FOR VEHICLE

(71) Applicant: SUBARU CORPORATION, Tokyo (JP)

(72) Inventors: Keisuke Motegi, Tokyo (JP); Hikaru Yoshikawa, Tokyo (JP); Masahito Sekine, Tokyo (JP); Yuta Sato, Tokyo (JP); Ryuya Azuma, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 566 days.

(21) Appl. No.: 17/895,679

(22) Filed: Aug. 25, 2022

(65) Prior Publication Data

US 2023/0090300 A1 Mar. 23, 2023

(30) Foreign Application Priority Data

Sep. 22, 2021 (JP) ................................ 2021-154819

(51) Int. Cl.

*G06V 20/56* (2022.01)
*B60W 60/00* (2020.01)

(52) U.S. Cl.

CPC ......... *G06V 20/588* (2022.01); *B60W 60/001* (2020.02); *B60W 2420/403* (2013.01); *B60W 2420/408* (2024.01); *B60W 2552/53* (2020.02)

(58) Field of Classification Search

CPC .............. G06V 20/588; B60W 60/001; B60W 2420/403; B60W 2420/408; B60W 2552/53

See application file for complete search history.

(56) References Cited

U.S. PATENT DOCUMENTS

2009/0030613 A1* 1/2009 Kataoka et al. ......... G08G 1/16 701/300
2015/0063648 A1 3/2015 Minemura et al.

(Continued)

FOREIGN PATENT DOCUMENTS

JP 2004-139338 A 5/2004
JP 2010-023721 A 2/2010

(Continued)

OTHER PUBLICATIONS

"A Road Edge Detection Approach for Marked and Unmarked Lanes Based on Video and Radar", by Florian Janda, et al., published in Proceedings of the 16th International Conference on Information Fusion (2013, pp. 871-876) (Year: 2013).*

(Continued)

*Primary Examiner* — Matthew C Bella
*Assistant Examiner* — Daniel J Santos
(74) *Attorney, Agent, or Firm* — Rimon P.C.

(57) ABSTRACT

A driving assist apparatus for a vehicle includes a camera device, a radar device, an image recognition unit, and a driving control unit. The camera device obtains images around the vehicle. The radar device obtains three-dimensional object data around the vehicle. The image recognition unit recognizes a marking line and a road edge and calculates a distance therebetween from a distance between the vehicle and the marking line and a distance between the vehicle and the road edge. The driving control unit controls driving of the vehicle based on the marking line and the road edge. When the image recognition unit fails to recognize the marking line, it sets an estimated marking line, based on the distance between the road edge and the marking line and the distance between the vehicle and the road edge, and the driving control unit controls the driving of the vehicle using the estimated marking line.

7 Claims, 4 Drawing Sheets

(56) References Cited

U.S. PATENT DOCUMENTS

| | | | | |
|---|---|---|---|---|
| 2016/0188984 | A1* | 6/2016 | Kawano et al. | G06K 9/00798 |
| 2017/0043772 | A1* | 2/2017 | Watanabe | B60W 30/12 |
| 2018/0373941 | A1* | 12/2018 | Kwant et al. | G60K 9/00798 |
| 2019/0241182 | A1 | 8/2019 | Sato et al. | |
| 2019/0302795 | A1* | 10/2019 | Kobayashi et al. | G05D 1/0246 |
| 2020/0104608 | A1* | 4/2020 | Watanabe | G06K 9/00798 |
| 2021/0031671 | A1* | 2/2021 | Kumano et al. | B60W 30/12 |
| 2022/0204027 | A1* | 6/2022 | Hitakatsu et al. | B60W 60/005 |
| 2023/0122011 | A1* | 4/2023 | Ishimaru et al. | G06V 20/588 |

FOREIGN PATENT DOCUMENTS

| | | | | |
|---|---|---|---|---|
| JP | 2015-045622 | A | 3/2015 | |
| WO | 2018-012180 | A1 | 1/2018 | |
| WO | WO 2021001018 | A1 * | 1/2021 | B60W 30/12 |

OTHER PUBLICATIONS

Office Action dated Jun. 10, 2025, issued in corresponding Japanese patent application No. 2021-154819, 5 pages.

* cited by examiner 1
10
11
11a
11b
12
IPU
13
IMAGE-RECOGNITION_ECU
14
DRIVING_ECU
36
36a
GNSS SENSOR
36b
ROADMAP DB
37
37lf
LEFT-FRONT SIDE SENSOR
37rf
RIGHT-FRONT SIDE SENSOR
37lr
LEFT-REAR SIDE SENSOR
37rr
RIGHT-REAR SIDE SENSOR
38
REAR-SIDE SENSOR
21
CP_ECU
22
E/G_ECU
23
T/M_ECU
24
BK_ECU
25
PS_ECU
31
HMI
32
THROTTLE ACTUATOR
33
FLUID PRESSURE CONTROL CIRCUIT
34
BRAKE ACTUATOR
35
ELECTRIC POWER STEERING MOTOR

DRIVING ASSIST APPARATUS FOR VEHICLE

CROSS-REFERENCE TO RELATED APPLICATIONS

The present application claims priority from Japanese Patent Application No. 2021-154819 filed on Sep. 22, 2021, the entire contents of which are hereby incorporated by reference.

BACKGROUND

The disclosure relates to a driving assist apparatus for a vehicle, which assists the driving of the vehicle based on surrounding environment information obtained by an in-vehicle camera device and an in-vehicle radar device.

Self-driving control technology for autonomously driving a vehicle, such as an automobile, without the intervention of a human driver is being developed. Meanwhile, various driving assist apparatuses that assist driving operations of a driver by employing this type of self-driving control technology are proposed and are being put to practical use.

This type of known driving assist apparatus uses sensing devices, such as an in-vehicle camera device and an in-vehicle radar device, as surrounding environment recognition devices that recognize the environment around a vehicle and obtain surrounding environment information.

The in-vehicle camera device captures digital images and identifies the environment around the vehicle, such as marking lines on the road surface (hereinafter simply called marking lines), three-dimensional objects (curbs and guardrails on the road edges, for example), pedestrians, and other vehicles, based on the obtained digital images.

The in-vehicle radar device outputs radio waves to an area around the vehicle, receives waves reflected by objects, and analyzes the reflected waves, thereby recognizing three-dimensional objects around the vehicle, such as curbs and guardrails on the road edges, pedestrians, and other vehicles.

Technology for identifying road shapes and marking lines using this type of surrounding environment recognition device and for assisting autonomous driving of a vehicle based on the obtained information is disclosed, for example, in Japanese Unexamined Patent Application Publication (JP-A) Nos. 2015-45622 and 2004-139338.

The driving assist apparatus for a vehicle disclosed in JP-A No. 2015-45622 includes an in-vehicle radar device and an in-vehicle camera device. The shapes of road edges are recognized based on detection information obtained by the in-vehicle radar device, and the shapes of lane lines, which are boundary lines of a driving lane, are recognized based on image information obtained by the in-vehicle camera device. Then, the recognized shapes of the road edges and those of the lane lines are compared with each other, and the shape of the road on which the vehicle is driving is specified in accordance with how much the shapes of the road edges and those of the lane lines are similar to each other.

The driving assist apparatus disclosed in JP-A No. 2004-139338 includes an in-vehicle camera device and an in-vehicle radar device. To recognize lane lines, using a change in the luminance of an image obtained by the in-vehicle camera device or using pattern matching based on an image obtained by the in-vehicle camera device is suitably selected based on information on the amount of light received by the in-vehicle radar device.

SUMMARY

An aspect of the disclosure provides a driving assist apparatus for a vehicle. The driving assist apparatus includes a camera device, a radar device, an image recognition unit, and a driving control unit. The camera device is configured to obtain, as first driving environment information, image data by capturing an image of environment around the vehicle. The radar device is configured to obtain, as second driving environment information, three-dimensional object data by outputting a radio wave to a region around the vehicle and sensing a reflected wave from a target. The image recognition unit is configured to recognize a road marking line based on the first driving environment information and to recognize a road edge based on the second driving environment information. The image recognition unit is configured to calculate a distance between the road marking line and the road edge from information on a relative distance between the vehicle and the road marking line and information on a relative distance between the vehicle and the road edge. The driving control unit is configured to control driving of the vehicle based on information on the road marking line recognized by the image recognition unit and information on the road edge recognized by the image recognition unit. In a case where the image recognition unit becomes unable to recognize the road marking line from the first driving environment information, the image recognition unit is configured to set an estimated road marking line corresponding to an extension from the road marking line, based on information on the distance between the road edge and the road marking line which was recognized immediately before the image recognition unit becomes unable to recognize the road marking line, and based on the information on the relative distance between the vehicle and the road edge which has been continuously recognized by the radar device. Then, the driving control unit is configured to control the driving of the vehicle based on the estimated road marking line.

An aspect of the disclosure provides a driving assist apparatus for a vehicle. The driving assist apparatus includes a camera device, a radar device, and circuitry. The camera device is configured to obtain, as first driving environment information, image data by capturing an image of environment around the vehicle. The radar device is configured to obtain, as second driving environment information, three-dimensional object data by outputting a radio wave to a region around the vehicle and sensing a reflected wave from a target. The circuitry is configured to recognize a road marking line based on the first driving environment information. The circuitry is configured to recognize a road edge based on the second driving environment information. The circuitry is configured to calculate a distance between the road marking line and the road edge from information on a relative distance between the vehicle and the road marking line and information on a relative distance between the vehicle and the road edge. The circuitry is configured to control driving of the vehicle based on information on the recognized road marking line and information on the recognized road edge. Upon becoming unable to recognize the road marking line from the first driving environment information, the circuitry is configured to set an estimated road marking line corresponding to an extension from the road marking line, based on information on the distance between the road edge and the road marking line which was recognized immediately before the circuitry becomes unable to recognize the road marking line, and also based on the information on the relative distance between the vehicle and the road edge which has been continuously recognized by the radar device. Then, the circuitry is configured to control the driving of the vehicle based on the estimated road marking line.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

The image recognition accuracy of an in-vehicle camera device, which is as a surrounding environment recognition device, for recognizing marking lines and three-dimensional objects, such as curbs on the road edge, may be degraded depending on the weather conditions and light conditions in the surrounding environment. For example, it is known that the image recognition accuracy of an in-vehicle camera device is likely to be lowered in bad weather, such as in rain, snow, and fog, or under a low illuminance or brightness, such as in the backlight or twilight. When a surrounding environment recognition device has become unable to recognize the surrounding environment with sufficient accuracy, it becomes difficult to continue to use driving assist functions of the driving assist apparatus.

In known driving assist apparatuses, such as those disclosed in JP-A Nos. 2015-45622 and 2004-139338, however, no measures are taken to continue to use driving assist functions of a driving assist apparatus when the image recognition accuracy of an in-vehicle camera device is reduced or the in-vehicle camera device has temporarily failed to recognize images for some reason.

It is desirable to provide a driving assist apparatus for a vehicle, which can suitably maintain and continue executing autonomous driving assist functions even when the image recognition accuracy of an in-vehicle camera device is temporarily reduced or the in-vehicle camera device has temporarily failed to recognize images for some reason while autonomous driving assist functions are being executed.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the embodiment, a description will be given, assuming that a road system in which vehicles drive on the left side in the traveling direction is employed. The embodiment is also applicable to a road system in which vehicles drive on the right side by merely reversing the left and right sides in the embodiment.

Figure 1:
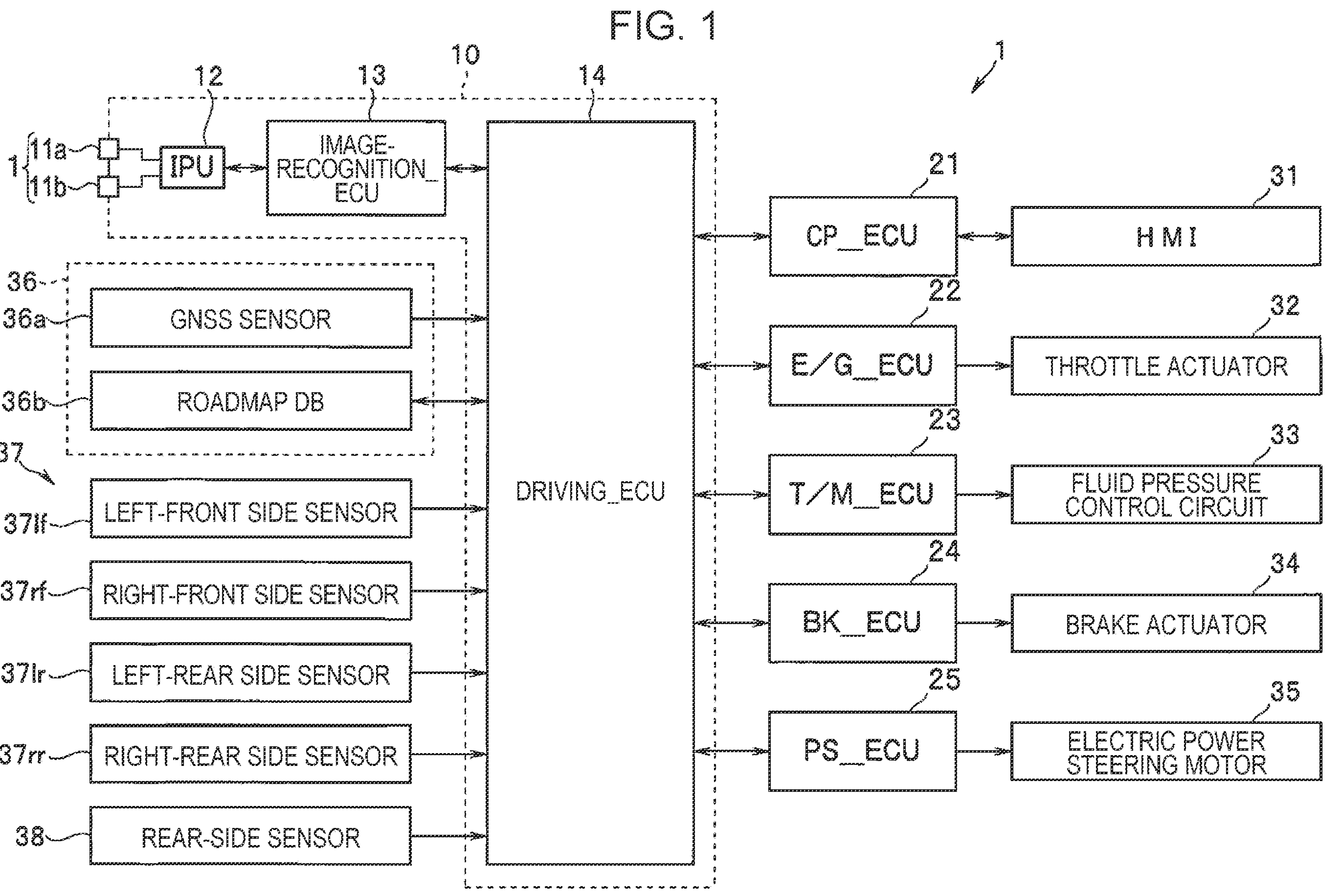
FIG. 1 is a block diagram illustrating the schematic configuration of a driving assist apparatus according to an embodiment of the disclosure.
Figure 2:
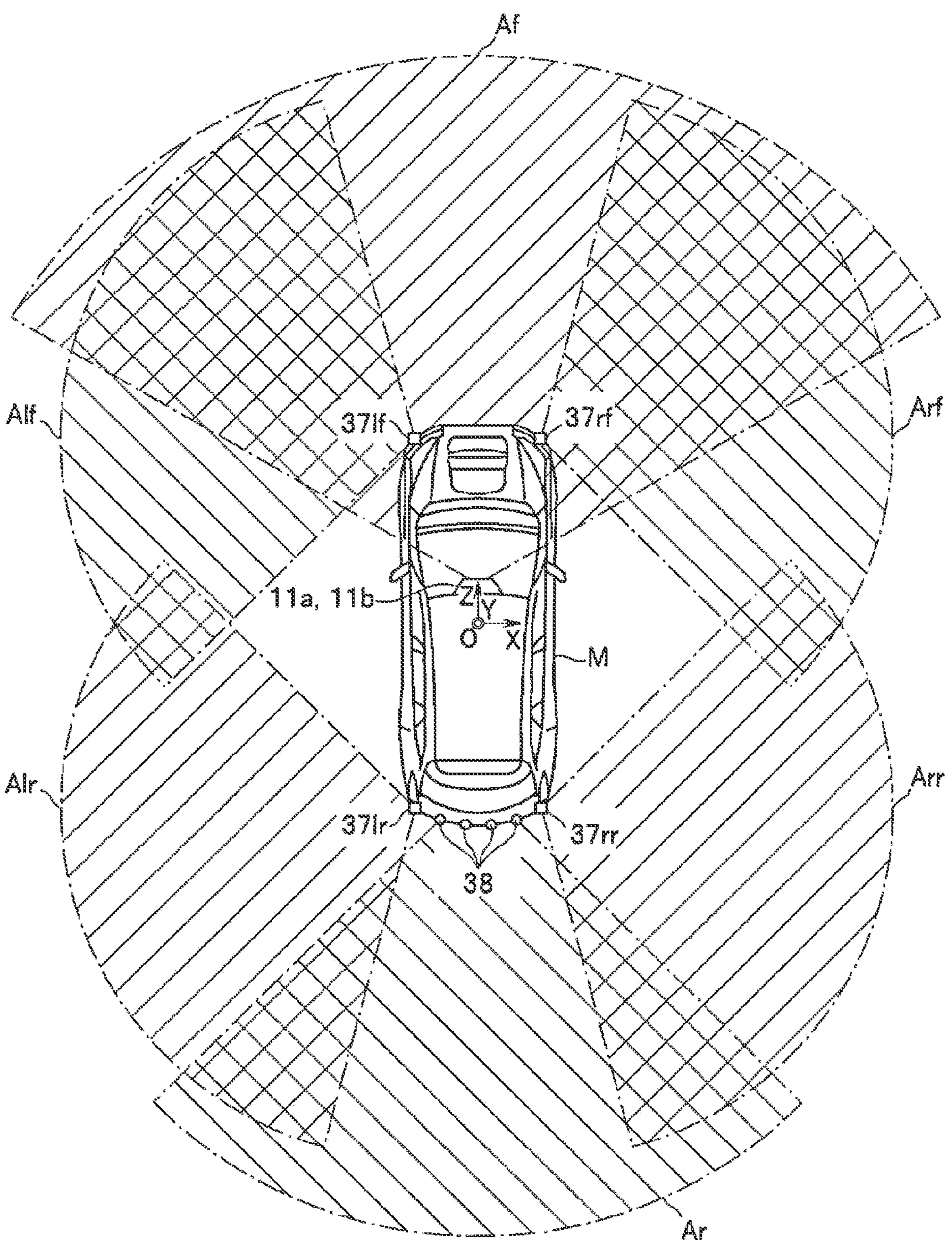
FIG. 2 is a conceptual view illustrating monitor areas of sensor devices (camera, radar, sonar) included in the driving assist apparatus of the embodiment.

The schematic configuration of a driving assist apparatus 1 according to the embodiment will be described below with reference to FIGS. 1 and 2. FIG. 1 is a block diagram illustrating the schematic configuration of the driving assist apparatus 1 according to the embodiment. FIG. 2 is a conceptual view illustrating monitor areas of sensor devices (camera, radar, sonar) included in the driving assist apparatus 1 of the embodiment.

As illustrated in FIG. 1, the driving assist apparatus 1 includes a camera unit 10, which is an in-vehicle camera device fixed at the center of the top front section in a compartment of a vehicle. The vehicle includes the driving assist apparatus 1 and will be hereinafter called the vehicle M (see FIGS. 2 and 3).

The camera unit 10 includes a stereo camera 11, an image processing unit (IPU) 12, an image recognition unit (image-recognition_ECU) 13, and a driving control unit (driving_ECU) 14.

The stereo camera 11 includes a main camera 11*a* and a sub-camera 11*b*. For example, the main camera 11*a* and the sub-camera 11*b* are disposed at horizontally symmetrical positions along the width of the vehicle M. The main camera 11*a* and the sub-camera 11*b* are constituted by complementary metal-oxide-semiconductor (CMOS) image sensors, for example. The main camera 11*a* and the sub-camera 11*b* perform stereo imaging from different viewpoints at preset imaging intervals synchronized with each other to image the driving environment in a front area Af (see FIG. 2) outside the vehicle M.

The IPU 12 performs predetermined image processing on image data on the surrounding environment which is obtained by the stereo camera 11 while the vehicle M is driving (driving environment image data). The IPU 12 then detects edges of various targets, such as three-dimensional objects included in the images and marking lines on the road surface (hereinafter simply called marking lines), thereby recognizing three-dimensional objects (hereinafter simply called objects) and marking lines around the vehicle M. The IPU 12 then obtains distance information based on the positional disparity of the edges between the left and right images and generates image information including this distance information (hereinafter called distance image information).

Based on the distance image information received from the IPU 12, the image-recognition_ECU 13 determines the road curvature [1/m] of marking lines that define the left and right sides of a driving lane where the vehicle M is driving and also determines the width (lane width) between the left and right marking lines. Various methods are known to determine the road curvature and the lane width. For example, based on driving environment information, the image-recognition_ECU 13 recognizes left and right marking lines by executing binarizing processing using the differences of the luminance levels, and finds the curvature of every predetermined zone of each of the left and right marking lines by using a curve approximation expression based on the least square method. The image-recognition-_ECU 13 then calculates the lane width from the difference in the curvature between the left and right marking lines.

The image-recognition_ECU 13 then calculates the center of the driving lane and a deviation of the lateral position of the vehicle M, for example, based on the lane width and the curvature of each of the left and right marking lines. A deviation of the lateral position of the vehicle M is the distance from the center of the driving lane to the center of the vehicle M in the widthwise direction.

The image-recognition_ECU 13 also performs predetermined pattern matching on the distance image information so as to recognize objects, such as guardrails and curbs along the road, and other objects, such as surrounding vehicles. In one example, for each object, the image-recognition_ECU 13 recognizes the type of object, height of the object, distance to the object, velocity of the object, relative velocity of the object to the vehicle M, and distance between objects (such as the lateral distance between a curb on the road edge and a marking line near the curb), for example.

The above-described various items of driving environment information obtained by the image-recognition_ECU 13 are output to the driving_ECU 14. In one embodiment, the driving environment information may be referred to as "first driving environment information".

In the embodiment, the image-recognition_ECU 13 forms, together with the stereo camera 11 and the IPU 12, a driving environment recognizer that obtains the first driving environment information on the environment around the vehicle M, and also implements a function as a surrounding environment recognition device.

The driving_ECU 14 is a control unit that centrally controls the driving assist apparatus 1. Various control units, such as a cockpit control unit (CP_ECU) 21, an engine control unit (E/G_ECU) 22, a transmission control unit (T/M_ECU) 23, a braking control unit (BK_ECU) 24, and a power steering control unit (PS_ECU) 25, are coupled to the driving_ECU 14 via an in-vehicle communication network, such as a controller area network (CAN).

Various sensors, such as a locator unit 36, an in-vehicle radar device 37 (left-front side sensor 37*lf*, right-front side sensor 37*rf*, left-rear side sensor 37*lr*, and right-rear side sensor 37*rr*), and a rear-side sensor 38, are also coupled to the driving_ECU 14.

A human machine interface (HMI) 31 disposed near a driver's seat is coupled to the CP_ECU 21. The HMI 31 includes a switch for providing an instruction to execute various driving assist control operations, a mode changing switch for changing the driving mode, a steering touch sensor that detects the steering state of a driver, a driver monitoring system (DMS) that performs face recognition of a driver and detects the eye direction of a driver, a touch-screen display, a combination meter, and a speaker.

In response to a control signal from the driving_ECU 14, the CP_ECU 21 suitably supplies various items of information to the driver. For example, the CP_ECU 21 supplies information on various alarms to be output to other vehicles, such as a leading vehicle, the execution situation of driving assist control, and the driving environment of the vehicle M to the driver. Information is displayed or output as sound using the HMI 31. The CP_ECU 21 also outputs various items of input information, such as ON/OFF operation states, to the driving_ECU 14. The input information is input by the driver using the HMI 31 in response to various driving assist control operations.

A throttle actuator 32 for an electronic control throttle, for example, is coupled to the output side of the E/G_ECU 22. Various sensors (not illustrated), such as an accelerator sensor, are coupled to the input side of the E/G_ECU 22.

The E/G_ECU 22 controls the driving of the throttle actuator 32 based on a control signal from the driving_ECU 14 or detection signals from various sensors. The E/G_ECU 22 adjusts the air intake amount of an engine and causes the throttle actuator 32 to generate a desired level of engine output. The E/G_ECU 22 also outputs detection signals, such as an accelerator position signal, output from various sensors to the driving_ECU 14.

A fluid pressure control circuit 33 is coupled to the output side of the T/M_ECU 23. Various sensors (not illustrated), such as a transmission position sensor, are coupled to the input side of the T/M_ECU 23. The T/M_ECU 23 performs fluid pressure control for the fluid pressure control circuit 33, based on an engine torque signal indicating an engine torque estimated by the E/G_ECU 22 and detection signals from various sensors. The T/M_ECU 23 operates certain elements, such as a friction element and a pulley, provided in an automatic transmission to transmit the engine output at a desired transmission gear ratio. The T/M_ECU 23 also outputs detection signals, such as a transmission position signal, output from various sensors to the driving_ECU 14.

A brake actuator 34 is coupled to the output side of the BK_ECU 24. The brake actuator 34 adjusts the brake fluid pressure to be applied to a brake wheel cylinder provided in each wheel. Various sensors (not illustrated), such as a brake pedal sensor, a yaw rate sensor, a longitudinal acceleration sensor, and a vehicle velocity sensor, are coupled to the input side of the BK_ECU 34.

The BK_ECU 24 controls the driving of the brake actuator 34, based on a control signal from the driving_ECU 14 or detection signals from various sensors. The BK_ECU 24 causes the brake actuator 34 to suitably generate a braking force in each wheel to perform forced braking control or yaw rate control for the vehicle M. The BK_ECU 24 outputs detection signals, such as signals of the braking state, yaw rate, longitudinal acceleration, and velocity of the vehicle M, output from various sensors to the driving_ECU 14.

An electric power steering motor 35 is coupled to the output side of the PS_ECU 25. The electric power steering motor 35 applies a steering torque to a steering mechanism by using a rotational force of the motor. Various sensors, such as a steering torque sensor and a steering angle sensor, are coupled to the input side of the PS_ECU 25.

The PS_ECU 25 controls the driving of the electric power steering motor 35, based on a control signal from the driving_ECU 14 or detection signals from various sensors. The PS_ECU 25 causes the electric power steering motor 35 to generate a steering torque in the steering mechanism. The PS_ECU 25 also outputs signals, such as a steering torque signal and a steering angle signal, output from various sensors to the driving_ECU 14.

The locator unit 36 includes a global navigation satellite system (GNSS) sensor 36*a* and a high-definition roadmap database (roadmap DB) 36*b*.

The GNSS sensor 36*a* receives positioning signals emitted from multiple positioning satellites so as to measure the position (such as the latitude, longitude, and altitude) of the vehicle M.

The roadmap DB 36*b* is a large-capacity storage medium, such as a hard disk drive (HDD) or a solid state drive (SSD), and stores high-definition roadmap information (dynamic map). The roadmap DB 36*b* stores lane data regarding each lane used for autonomous driving. Examples of the lane data are the lane width, coordinates of the position of the lane center, azimuth angle in the traveling direction, and speed limit. The lane data is stored on a roadmap at intervals of several meters of each lane. The roadmap DB 36*b* also stores information, such as parking lots and various other facilities. In response to a request signal from the driving_ECU 14, for example, the roadmap DB 36*b* outputs roadmap information within a set range based on the position of the vehicle M measured by the GNSS sensor 36*a* to the driving_ECU 14. In one embodiment, such roadmap information may be referred to as "third driving environment information".

In the embodiment, the roadmap DB 36*b* forms, together with the GNSS sensor 36*a*, the driving environment recognizer that obtains the third driving environment information on the environment around the vehicle M, and also implements a function as the surrounding environment recognition device.

The left-front side sensor 37*lf*, the right-front side sensor 37*rf*, the left-rear side sensor 37*lr*, and the right-rear side sensor 37*rr* are multiple sensors forming the in-vehicle radar device 37, and are constituted by millimeter radars, for example.

Each millimeter radar outputs radio waves, receives reflected waves generated as a result of the output radio waves being reflected by objects, and analyzes the received reflected waves. By analyzing the received reflected waves, each millimeter radar mainly detects pedestrians and objects, such as vehicles driving along the vehicle M in the same direction, and also detects structures (such as curbs, guardrails, building walls, and plants) disposed on the road edges (such as the edges of the road shoulder). In one example, each millimeter radar detects, as information concerning an object, the lateral width, the positions of representative points (relative position and relative distance of the object to the vehicle M), and relative velocity.

The left-front side sensor 37*lf* and the right-front side sensors 37*rf* are respectively installed on the left and right sides of a front bumper of the vehicle M, for example. The left-front side sensor 37*lf* and the right-front side sensors 37*rf* respectively detect objects in an area Alf from the obliquely left-front side to the left side and an area Arf from the obliquely right-front side to the right side (see FIG. 2), which are difficult to recognize by images captured by the stereo camera 11. In one embodiment, information on objects detected by the left-front side sensor 37*lf* and the right-front side sensor 37*rf* may be referred to as "second driving environment information".

The left-rear side sensor 37*lr* and the right-rear side sensor 37*rr* are respectively installed on the left and right sides of a rear bumper of the vehicle M, for example. The left-rear side sensor 37*lr* and the right-rear side sensor 37*rr* respectively detect objects in an area Alr from the obliquely left-rear side to the rear side and an area Arr from the obliquely right-rear side to the rear side (see FIG. 2), which are difficult to recognize by the left-front side sensor 37*lf* and the right-front side sensor 37*rf*. In one embodiment, information on objects detected by the left-rear side sensor 37*lr* and the right-rear side sensor 37*rr* may be referred to as "second driving environment information".

In the embodiment, the in-vehicle radar device 37 (left-front side sensor 37*lf*, right-front side sensor 37*rf*, left-rear side sensor 37*lr*, and right-rear side sensor 37*rr*) forms the driving environment recognizer that obtains the second driving environment information on the environment around the vehicle M and also implements a function as the surrounding environment recognition device. Information obtained by the left-front side sensor 37*lf*, right-front side sensor 37*rf*, left-rear side sensor 37*lr*, and right-rear side sensor 37*rr* is sent to the image-recognition_ECU 13.

The rear-side sensor 38 is constituted by sonar devices. The rear-side sensor 38 is installed on the rear bumper, for example. The rear-side sensor 38 detects objects in an area Ar (see FIG. 2) at the back of the vehicle M, which is difficult to recognize by the left-rear side sensor 37*lr* and the right-rear side sensor 37*rr*. In one example, information on objects detected by the rear-side sensor 38 may serve as fourth driving environment information.

In the embodiment, the rear-side sensor 38 forms the driving environment recognizer that obtains the fourth driving environment information on the environment around the vehicle M and also implements a function as the surrounding environment recognition device.

The driving_ECU 14 converts the coordinates of each object outside the vehicle M indicated by the first driving environment information obtained by the image-recognition_ECU 13, the third driving environment information obtained by the locator unit 36, the second driving environment information obtained by the left-front side sensor 37*lf*, right-front side sensor 37*rf*, left-rear side sensor 37*lr*, and right-rear side sensor 37*rr*, and the fourth driving environment information obtained by the rear-side sensor 38 into coordinates of a three-dimensional coordinate system (see FIG. 2) having the center of the vehicle M as an origin.

In the driving_ECU 14, a manual driving mode, first and second driving control modes, and a safe mode, are set as the driving modes. The driving_ECU 14 can selectively switch between these modes, based on the operation state of the mode changing switch disposed in the HMI 31, for example.

The manual driving mode is a mode performed by driver's steering. For example, in the manual driving mode, the driver manually drives the vehicle M by steering, accelerating, and braking.

The first driving control mode is also a mode performed by driver's steering. The first driving control mode is a semi-autonomous driving mode to cause the vehicle M to run along a target driving route. For example, in the first driving control mode, while driving operations of the driver are being reflected, vehicle-to-vehicle distance control (adaptive cruise control (ACC)), active lane keep centering (ALKC) control, and active lane keep bouncing (ALKB) control are suitably combined and performed under the control of the E/G_ECU 22, BK_ECU 24, and PS_ECU 25.

ACC control is performed basically based on the first driving environment information input from the image-recognition_ECU 13, that is, based on leading vehicle information included in the first driving environment information.

ALKC control and ALKB control are performed basically based on at least one of the first driving environment information input from the image-recognition_ECU 13 or the third driving environment information input from the locator unit 36. For example, ALKC control and ALKB control are performed based on lane marking line information included in the first driving environment information or the third driving environment information.

The second driving control mode is an autonomous driving mode which implements the so-called hands-off function without using steering, accelerating, and braking operations of a driver. For example, in the second driving control mode, ACC control, ALKC control, and ALKB control are suitably combined and performed under the control of the E/G_ECU 22, BK_ECU 24, and PS_ECU 25, so that the vehicle M is autonomously driven to run along a target driving route (route map information).

The safe mode is a mode in which the vehicle M is automatically brought to a stop in a pedestrian zone, for example, when the vehicle M has become unable to continue driving in the second driving control mode and failed to take over to the driving of a driver (that is, to the manual driving mode or the first driving control mode).

In each of the above-described driving modes, the driving_ECU 14 suitably performs autonomous emergency braking (AEB) control if the vehicle M is likely to collide with an obstacle, such as a leading vehicle, on a driving lane where the vehicle M is driving.

All or some of the locator unit 36, image-recognition_ECU 13, driving_ECU 14, CP_ECU 21, E/G_ECU 22, T/M_ECU 23, BK_ECU 24, and PS_ECU 25 are constituted by a processor including hardware.

The processor is configured as in a known processor. For example, the processor includes a central processing unit (CPU), a random access memory (RAM), a read only memory (ROM), a non-volatile memory, and a non-volatile storage, as well as a non-transitory computer readable medium, and also includes peripheral devices.

Software programs to be executed by the CPU and fixed data, such as data tables, are suitably stored in the ROM, non-volatile memory, and non-volatile storage. The CPU reads a software program stored in the ROM, for example, loads it into the RAM, and executes it, and the software program refers to various items of data. As a result, the individual functions of the above-described elements and units (locator unit 36, image-recognition_ECU 13, driving_ECU 14, CP_ECU 21, E/G_ECU 22, T/M_ECU 23, BK_ECU 24, and PS_ECU 25) are implemented.

The processor may be constituted by a semiconductor chip, such as a field programmable gate array (FPGA). Each of the above-described elements and units (locator unit 36, image-recognition_ECU 13, driving_ECU 14, CP_ECU 21, E/G_ECU 22, T/M_ECU 23, BK_ECU 24, and PS_ECU 25) may be constituted by an electronic circuit.

The entirety or part of the software programs may be recorded as a computer program product in a portable disc medium, such as a flexible disk, a compact disc-read only memory (CD-ROM), and a digital versatile disc-read only memory (DVD-ROM), or in a non-transitory computer readable medium, such as a card memory, an HDD, and an SSD.

Figure 3:
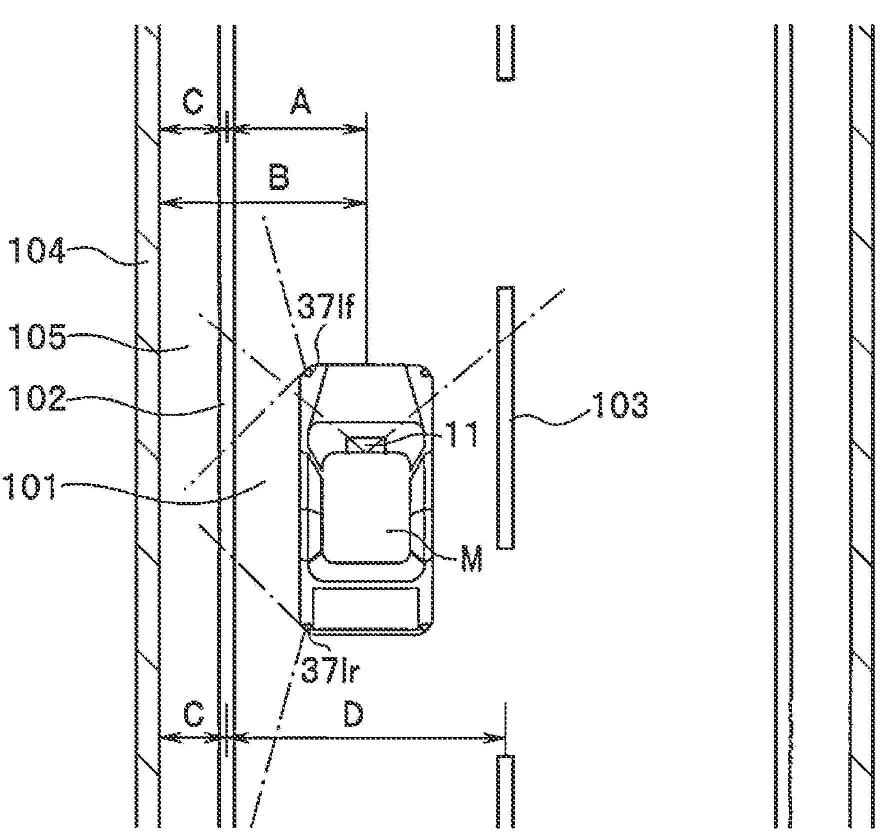
FIG. 3 conceptually illustrates that a vehicle M including the driving assist apparatus of the embodiment is driving on the road.
Figure 4:
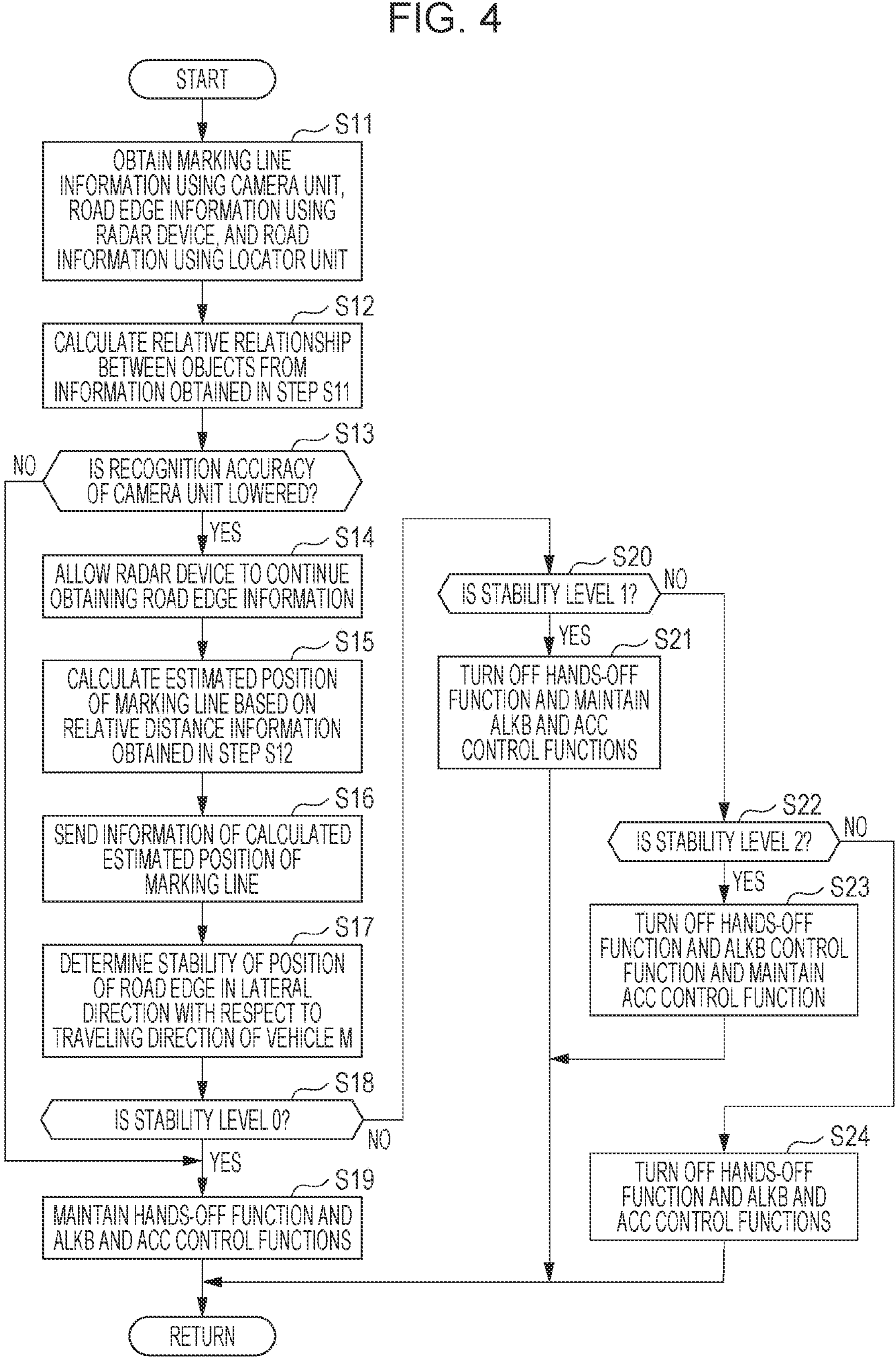
FIG. 4 is a flowchart illustrating the operation of the driving assist apparatus of the embodiment.

The operation of the driving assist apparatus 1 of the embodiment configured as described above will be described below with reference to FIGS. 3 and 4. FIG. 3 conceptually illustrates that the vehicle M including the driving assist apparatus 1 is driving on the road. FIG. 4 is a flowchart illustrating the operation of the driving assist apparatus 1.

In FIG. 3, a vehicle including the driving assist apparatus 1 is indicated by the vehicle M. The vehicle M is driving in a driving lane 101. The driving lane 101 is defined by a marking line 102 on the left side of the driving lane 101 (hereinafter called the left-side marking line 102) and a marking line 103 on the right side of the driving lane 101 (hereinafter called the right-side marking line 103). The right-side marking line 103 is closer to the center of the road. The road illustrated in FIG. 3 has a single lane each way. That is, the right-side marking line 103 is the center line of the road. A road edge 104 on the left side of the driving lane 101 (hereinafter may also be called the left-side road edge 104) is illustrated in FIG. 3. Specific examples of the left-side road edge 104 are a curb, a guardrail installed at the boundary between the road and a sidewalk, for example, and an object, such as a wall. A region 105 between the left-side marking line 102 and the left-side road edge 104 is also illustrated in FIG. 3. The region 105 is a road shoulder or a pedestrian zone.

In FIG. 3, the double-headed arrow A indicates the relative distance (lateral distance) between the vehicle M and the left-side marking line 102; the double-headed arrow B indicates the relative distance (lateral distance) between the vehicle M and the left-side road edge 104; the double-headed arrow C indicates the lateral distance between the left-side marking line 102 and the left-side road edge 104; and the double-headed arrow D indicates the lateral distance of the driving lane 101, that is, the lane width of the driving lane 101.

It is assumed that the vehicle M including the driving assist apparatus 1 is running in the driving lane 101, as illustrated in FIG. 3. It is also assumed that the driving assist apparatus 1 is set in the first driving control mode or the second driving control mode, that is, certain autonomous driving assist functions, such as ACC, ALKC, and ALKB control functions, are being executed. The hands-off function (second driving control mode) may also be executed.

In FIG. 4, in step S11, the driving assist apparatus 1 in the above-described state activates the camera unit 10 to obtain marking line information (information mainly on the left-side marking line 102). The driving assist apparatus 1 also operates the in-vehicle radar device 37 to obtain road edge information (information mainly on the left-side road edge 104) and also activates the locator unit 36 to obtain information on the road on which the vehicle M is currently running (various item of road information including information on the lane width D).

For example, as a result of the IPU 12 executing predetermined arithmetic processing based on a pair of image data items, the camera unit 10 calculates the relative distance (lateral distance A) between the vehicle M and the left-side marking line 102.

The relative distance (lateral distance B) between the vehicle M and the left-side road edge 104 can be calculated as a result of the image-recognition_ECU 13 executing predetermined arithmetic processing, based on information obtained by the left-front side sensor **37*lf* or the left-rear side sensor 37*lr* of the in-vehicle radar device 37**.

The lateral distance of the driving lane 101 (that is, the lane width D) can be calculated as a result of the image-recognition_ECU 13 executing predetermined arithmetic processing, based on distance information on the distance between the vehicle M and each of the left-side marking line 102 and the right-side marking line 103 obtained by the camera unit 10, or the distance between the left-side marking line 102 the right-side marking line 103. Information on the lane width D may be obtained from the roadmap information DB **36*b* of the locator unit 36**.

In step S12, the image-recognition_ECU 13 calculates the relative relationship between targets (distance between targets, for example), based on the items of information obtained in step S11. In one example, the relative distance C between the left-side marking line 102 and the left-side road edge 104 can be calculated as a result of the image-recognition_ECU 13 executing predetermined arithmetic processing, based on the lateral distance A obtained by the camera unit 10 and the lateral distance B obtained by the in-vehicle radar device 37.

In step S13, the image-recognition_ECU 13 determines whether the image recognition accuracy of the camera unit 10 is lowered. This determination may be made according to whether the detection of the edges of the left-side marking line 102 has become unstable or has failed, for example. If the image recognition accuracy is found to be lowered, the process proceeds to step S14. If the image recognition accuracy is not lowered, in other words, if the image recognition accuracy is normal, the process proceeds to step S19.

In step S14, the image-recognition_ECU 13 causes the camera unit 10 to stop executing image recognition processing or does not refer to the processing result of the image recognition processing, while the in-vehicle radar device 37 continues obtaining information on the left-side road edge 104.

Then, in step S15, the image-recognition_ECU 13 calculates the estimated position of the left-side marking line 102, based on the relative distance information obtained in step S12.

In step S16, the image-recognition_ECU 13 sends information of the estimated position of the left-side marking line 102 calculated in step S15 to the driving_ECU 14 of the camera unit 10. In this manner, the position of the left-side marking line 102 is estimated after the camera unit 10 has failed to recognize it. A marking line estimated in this manner will be called an estimated marking line.

In step S17, the driving_ECU 14 checks the stability of the position of the left-side road edge 104 in the lateral direction with respect to the traveling direction of the vehicle M. As discussed above, the left-side road edge 104 is a curb, a guardrail, or a building wall, for example. For instance, in high-standard roads, such as freeways and highways, the left-side road edge 104, such as a curb or a guardrail, continuously extends in a relatively stable shape.

Even in a high-standard road, however, in regions near entrances, exits, road junctions, rest areas, and tollgates (hereinafter collectively called road facilities), a lane branches off or merges into a main lane or a lane ends or another lane starts. In such regions, the left-side marking line of the driving lane of the vehicle M becomes discontinuous. In a high-standard road, emergency parking bays and route bus stops (hereinafter included in the road facilities) may be installed at regular intervals. In the regions where such road facilities are installed, the position of the left-side road edge 104 is likely to become temporarily unstable. Nevertheless, information on such road facilities is included in roadmap information, so that the driving assist apparatus 1 can recognize such road facilities in advance.

In the case of a local road, usually, a curb or a guardrail as the road edge 104 is formed in a discontinuous shape due to the provision of an entrance to and an exit from a commercial facility or a residential area facing the road. Additionally, in a local road, a building or a wall may be constructed on the road edge 104. In this case, a wall is usually formed in a discontinuous shape along the road.

In the case of a local road, no structures may exist along a road, in which case, the road edge 104 may not be recognized at all. A road on a river embankment and a wide-area agricultural road are examples of such a local road. In this case, the road edge 104 can be recognized by none of the devices, that is, neither of the camera unit 10 nor the in-vehicle radar device 37.

Based on the above-described assumptions, the stability degrees of the position of the left-side road edge 104 are grouped into multiple levels. In this manner, the stability level of the position of the left-side road edge 104 is determined based on the detection results of the in-vehicle radar device 37 and information obtained from the locator unit 36 (hereinafter called locator information).

In one example, if the following conditions are satisfied: the vehicle M is running in a high-standard road; the detection results of the in-vehicle radar device 37 are stable; and the locator information indicates that there are no road facilities near the vehicle M, the stability level is set to be 0.

In one example, if the following conditions are satisfied: the vehicle M is running in a high-standard road; the detection results of the in-vehicle radar device 37 are stable; and the locator information indicates that there are road facilities near the vehicle M, the stability level is set to be 1.

In one example, if the following conditions are satisfied: the vehicle M is running in a local road; and the detection results of the in-vehicle radar device 37 sometimes become unstable but the road edge 104 is continuously identified, the stability level is set to be 2.

In one example, if the following conditions are satisfied: the vehicle M is running in a local road; and the in-vehicle radar device 37 fails to identify the road edge 104, the stability level is set to be 3. The above-described approach to determining the stability level is only an example. The stability level of the position of the left-side road edge 104 may be determined in a different manner.

In step S18, the driving_ECU 14 checks whether the stability level is 0. If the stability level is found to be 0, it means that the shape of the left-side road edge 104 is stable and the estimated position of the left-side marking line 102 is reliable. The process thus proceeds to step S19. If the stability level is found to be other than 0, the process proceeds to step S20.

In step S19, among autonomous driving assist functions in execution, the driving_ECU 14 maintains the execution of ALKB control and ACC control, for example. If the driving assist apparatus 1 is set in the second driving control mode, the driving_ECU 14 maintains the hands-off function. That is, when the stability level of the left-side road edge 104 is 0, it means that these autonomous driving assist functions can be executed. The above-described autonomous driving assist functions are only examples. The process then resumes (returns to) the previous processing.

In step S20, the driving_ECU 14 checks whether the stability level is 1. If the stability level is found to be 1, the process proceeds to step S21. If the stability level is found to be other than 0 or 1, the process proceeds to step S22.

In step S21, among autonomous driving assist functions in execution, the driving_ECU 14 maintains the execution of ALKB control and ACC control, for example. If the driving assist apparatus 1 is set in the second driving control mode, the driving_ECU 14 turns OFF the hands-off function. That is, when the stability level of the road edge 104 is 1, it means that the execution of some autonomous driving assist functions is allowed (ON), while that of some functions is not allowed (OFF). The above-described autonomous driving assist functions are only examples. The process then resumes (returns to) the previous processing.

When turning OFF an autonomous driving assist function, it is desirable to inform the driver that the assist function will be turned OFF. This also applies to steps S23 and S24.

In step S22, the driving_ECU 14 checks whether the stability level is 2. If the stability level is found to be 2, the process proceeds to step S23. If the stability level is found to be other than 0, 1, or 2, the process proceeds to step S24.

In step S23, among autonomous driving assist functions in execution, the driving_ECU 14 maintains the execution of ACC control and turns OFF the execution of ALKB control, for example. If the driving assist apparatus 1 is set in the second driving control mode, the driving_ECU 14 turns OFF the hands-off function. That is, when the stability level of the road edge 104 is 2, it means that the execution of some autonomous driving assist functions is allowed (ON), while that of some functions is not allowed (OFF). The above-described autonomous driving assist functions are only examples. The process then resumes (returns to) the previous processing.

In step S24, the driving_ECU 14 checks that the stability level is 3 and turns OFF all the autonomous driving assist functions. That is, when the stability level of the road edge 104 is 3, it means that the execution of none of the autonomous driving assist functions is allowed (OFF). The above-described autonomous driving assist functions are only examples. The process then resumes (returns to) the previous processing.

As described above, according to the above-described embodiment, the image-recognition_ECU 13 recognizes the left-side marking line 102 based on the first driving environment information obtained by the camera unit 10 and also recognizes the left-side road edge 104 based on the second driving environment information obtained by the in-vehicle radar device 37. The image-recognition_ECU 13 also calculates the lateral distance A, which is the relative distance between the vehicle M and the left-side marking line 102, and the lateral distance B, which is the relative distance between the vehicle M and the left-side road edge 104. The image-recognition_ECU 13 then calculates the distance C between the left-side marking line 102 and the left-side road edge 104.

When the image-recognition_ECU 13 becomes unable to recognize the left-side marking line 102 from the first driving environment information obtained by the camera unit 10, it sets an estimated marking line, which corresponds to an extension from the left-side marking line 102, based on the distance C between the left-side road edge 104 and the left-side marking line 102, which is recognized immediately before the image-recognition_ECU 13 has failed to recognize the left-side marking line 102, and based on the relative distance B between the vehicle M and the left-side road edge 104, which is continuously recognized by the in-vehicle radar device 37. The image-recognition_ECU 13 may also use the third driving environment information obtained by the locator unit 36 to set the estimated marking line.

Based on the estimated marking line set as described above, the driving control unit (driving_ECU) 14 controls the driving of the vehicle M.

In this case, the driving control unit (driving_ECU 14) determines the stability of the road edge 104, which is recognized based on the second driving environment information obtained by the in-vehicle radar device 37, and determines whether to maintain or cancel the execution of each autonomous driving assist function based on the stability level.

With this configuration, even when the image recognition accuracy of the camera unit 10 is temporarily reduced or the camera unit 10 has temporarily failed to recognize images for some reason while autonomous driving assist functions are being executed, the driving assist apparatus 1 of the embodiment can suitably maintain and continue executing autonomous driving assist functions.

The driving assist apparatus 1 maintains or cancels autonomous driving assist functions in execution in accordance with the environment around the vehicle M, thereby making it possible to continue safer driving.

In the above-described embodiment, the vehicle M is driving in a road having a single lane each way, as illustrated in FIG. 3. However, the disclosure is also applicable to a case in which the vehicle M is driving in an overtake lane of a road having two lanes each way, that is, the vehicle M is driving in a lane closer to the center of the road. In this case, the left-side marking line of the overtake lane where the vehicle M is driving is not the marking line near the road edge, but the right-side marking line of the driving lane left next to the overtake lane. In this example, too, the left-side marking line seen from the vehicle M can be estimated in a similar manner to the embodiment, based on the distance between the left-side marking line and the road edge (such as a curb) recognized by the vehicle M.

The disclosure is also applicable to a case in which the vehicle M is driving in a lane of a road having three lanes each way, that is, the vehicle M is driving in a lane closest to the center of the road. In this case, if the right-side median strip is recognized as the road edge, the disclosure is also applicable to this case by reversing the left and right sides in the embodiment.

The disclosure is not limited to the above-described embodiment and various modifications, variations, and applications may be made without departing from the spirit and scope of the disclosure. For example, some of the elements disclosed in the embodiment may be omitted suitably, and elements in different embodiments may be combined suitably. It is intended that the scope of the disclosure be restricted by the following claims and their equivalents but not by specific embodiments.

The driving assist apparatus 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the locator unit 36, image-recognition_ECU 13, driving_ECU 14, CP_ECU 21, E/G_ECU 22, T/M_ECU 23, BK_ECU 24, and PS_ECU 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving assist apparatus for a vehicle, the driving assist apparatus comprising:

a camera device configured to obtain, as first driving environment information, image data by capturing an image of environment around the vehicle;

a radar device configured to obtain, as second driving environment information, three-dimensional object data by outputting a radio wave output to a region around the vehicle and sensing a reflected wave from a target; and one or more processors configured to:

recognize a road marking line based on the first driving environment information;

recognize a road edge based on the second driving environment information;

calculate a first relative distance between the vehicle and the road marking line;

calculate a second relative distance between the vehicle and the road edge;

calculate a third relative distance between the road marking line and the road edge based on the first relative distance and the second relative distance; and retain the third relative distance as a previously recognized distance, wherein the previously recognized distance is the third relative distance recognized immediately before either (i) recognition of the road marking line by the one or more processors becomes unstable or (ii) the one or more processors become unable to recognize the road marking line;

execute a first driving control to control driving of the vehicle based on information on the recognized road marking line and information on the recognized road edge;

during execution of the first driving control, determine whether the recognition of the road marking line by the one or more processors becomes unstable or the one or more processors become unable to recognize the road marking line; and in response to determining that the recognition of the road marking line by the one or more processors becomes unstable or the one or more processors become unable to recognize the road marking line, (i) terminate the execution of the first driving control and (ii) execute a second driving control to:

(i) obtain a currently recognized second relative distance between the vehicle and the road edge based on the second driving environment information;

(ii) without using the first driving environment information, estimate a road marking line based on the retained previously recognized distance and the currently recognized second relative distance; and (iii) control the driving of the vehicle based on the estimated road marking line.

2. The driving assist apparatus according to claim 1, further comprising:

a locator unit configured to store roadmap information, measure a position of the vehicle based on a positioning signal, and obtain, as third driving environment information, environment information around the vehicle including the position of the vehicle, wherein the one or more processors are configured to also use the third driving environment information to set the estimated road marking line.

3. The driving assist apparatus according to claim 1, wherein the one or more processors are configured to:

determine a stability level of the road edge, the road edge being recognized based on the second driving environment information, the stability level indicating a degree of continuity in recognition of the road edge in a traveling direction of the vehicle; and determine whether to continue or cancel an autonomous driving assist of the vehicle in accordance with the stability level.

4. The driving assist apparatus according to claim 3, wherein the one or more processors are further configured to:

during execution of the second driving control, perform (i) a first autonomous driving assist, in which the one or more processors control a steering of the vehicle with hands-off function or (ii) a second autonomous driving assist, in which the one or more processors control the steering of the vehicle without hands-off function;

perform the first autonomous driving assist when the stability level is equal to or higher than a first level;

perform the second autonomous driving assist when the stability level is lower than the first level and higher than a second level; and cancel the execution of the second driving control when the stability level is lower than the second level.

5. The driving assist apparatus according to claim 4, further comprising a locator unit configured to store roadmap information, measure a position of the vehicle based on a positioning signal, and obtain, as third driving environment information, environment information around the vehicle including the position of the vehicle, wherein the one or more processors are configured to:

determine, in accordance with an establishment of following conditions, the stability level as a value of the first level or higher:

(i) the one or more processors, based on the third driving environment information, determine that the vehicle is traveling on a freeway;

(ii) the one or more processors, based on the third driving environment information, determine that the vehicle is not traveling in an entrance, exit, road junction, rest area, or tollgate; and (iii) the one or more processors, based on the second driving environment information, continuously recognize the road edge;

determine, in accordance with an establishment of following conditions, the stability level as a value less than the first level and greater than or equal to the second level:

(i) the one or more processors, based on the third driving environment information, determine that the vehicle is traveling on a freeway; and (ii) the one or more processors, based on the third driving environment information, determine that the vehicle is traveling in an entrance, exit, road junction, rest area, or tollgate; and determine, in accordance with an establishment of following condition, the stability level as a value less than the second level:

(i) the one or more processors, based on the third driving environment information, determine that the vehicle is traveling on a local road.

6. The driving assist apparatus according to claim 1, wherein the configured to recognize the road edge that is an object installed at a boundary between a road on which the vehicle travels and a sidewalk of the road.

7. A driving assist apparatus for a vehicle, the driving assist apparatus comprising:

a camera device configured to obtain, as first driving environment information, image data by capturing an image of environment around the vehicle;

a radar device configured to obtain, as second driving environment information, three-dimensional object data by outputting a radio wave to a region around the vehicle and sensing a reflected wave from a target; and circuitry configured to:

recognize a road marking line based on the first driving environment information;

recognize a road edge based on the second driving environment information;

calculate a first relative distance between the vehicle and the road marking line;

calculate a second relative distance between the vehicle and the road edge;

calculate a third relative distance between the road marking line and the road edge based on the first relative distance and the second relative distance;

retain the third relative distance as a previously recognized distance, wherein the previously recognized distance is the third relative distance recognized immediately before either (i) recognition of the road marking line by the circuitry becomes unstable or (ii) the circuitry become unable to recognize the road marking line;

execute a first driving control to control driving of the vehicle based on information on the recognized road marking line and information on the recognized road edge;

during execution of the first driving control, determine whether the recognition of the road marking line by the circuitry becomes unstable or the circuitry become unable to recognize the road marking line; and in response to determining that the recognition of the road marking line by the circuitry becomes unstable or the circuitry become unable to recognize the road marking line, (i) terminate the execution of the first driving control and (ii) execute a second driving control to:

(i) obtain a currently recognized second relative distance between the vehicle and the road edge based on the second driving environment information;

(ii) without using the first driving environment information, estimate a road marking line based on the retained previously recognized distance and the currently recognized second relative distance; and (iii) control the driving of the vehicle based on the estimated road marking line.

* * * * *